Patented Oct. 17, 1933

1,931,374

UNITED STATES PATENT OFFICE 1,931,374

SODIUM ALUMINATE

Leslie Marshall Clark and Henry Mills Spittle, Northwich, England, assignors to Imperial Chemical Industries, Limited, London, England, a British Company No Drawing. Application July 8, 1932, Serial No. 621,510, and in Great Britain July 17, 1931

7 Claims. (Cl. 23—52)

The present invention relates to processes of obtaining sodium aluminate from aluminous ores such as bauxite, and is based on our observation that sodium aluminate crystallizes from strongly alkaline solution with a definite chemical composition at certain temperatures and concentrations. Accordingly the invention comprises a process of obtaining crystalline sodium aluminate of definite composition by controlling the composition and concentration of sodium aluminate solutions and effecting crystallization at certain temperatures.

Sodium aluminate is commonly obtained by treating natural hydrated aluminum oxide, such as bauxite, etc., with caustic soda or with soda ash at superatmospheric pressures. After purification, the solutions are concentrated and used as such or they are evaporated to dryness whereby semifused masses are obtained, which on cooling solidify and are broken up.

Our novel process of allowing sodium aluminate to crystallize from aqueous, alkaline solutions, results in readily soluble, very pure products of the composition $Na_2O.Al_2O_3.2H_2O$ or the corresponding anhydrous $Na_2O.Al_2O_3$, depending upon the concentration of the liquor and the crystallization temperature.

The production of the solutions from which we can crystallize the above compounds follows usual practice of opening up bauxite or other aluminous ores by treatment with an alkali, such as sodium hydroxide or sodium carbonate, and the performance of our invention is independent of the source of the sodium aluminate liquor used, though we prefer to use relatively pure solutions except as to the content of free alkali therein.

In the preparation of the sodium aluminate solution, we can, for instance, use a 40% solution of NaOH and extract bauxite with this solution at 120–130° C. A sodium aluminate liquor having a ratio of about $1.9$–$2Na_2O$ to $1Al_2O_3$ is thus obtained. In order to facilitate crystallization it is preferred that the composition of the liquor should not differ much from this ratio, i. e. it should lie within the range $1.5$–$2.5Na_2O$ to $1Al_2O_3$. Any adjustment that may be required for this purpose is accordingly made.

The so obtained extraction liquor is filtered or otherwise freed from solid impurities present. To facilitate filtration, it may be desirable to dilute the liquor to a concentration of about 28% of solids, expressed as $Na_2O+Al_2O_3$.

In carrying out the crystallization of the sodium aluminate from this solution, it is most essential that the conditions of the crystallizations are carefully controlled, such that crystals corresponding either to the compound

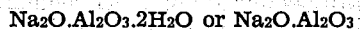
$Na_2O.Al_2O_3.2H_2O$ or $Na_2O.Al_2O_3$ are obtained as the solid phase. To obtain the hydrated compound, the concentration of the liquor, expressed in terms of $Na_2O+Al_2O_3$, should be within the range 45–65% and preferably around 55% and the liquor cooled to below about 100° C.

To obtain anhydrous sodium aluminate, the liquor should be concentrated to about 78% and crystallization effected at higher temperatures, e. g. 100° C. or over.

The sodium aluminate liquor used for the crystallization operation, according to our invention, is accordingly adjusted within the stated ranges, normally by reconcentration, depending on the product desired.

To assist the crystallization, the liquor may be suitably seeded. When a continuous process is operated, this is usually unnecessary in view of the presence of solid matter from preceding operations. The crystals are freed as completely as possible from adhering mother liquor (e. g. by centrifuging) and, if and as required, washed and/or dried. In case the magma of crystals and mother liquor resulting from the crystallization is too thick for convenient handling, it may be diluted with a suitable proportion, e. g. 35% of mother liquor from a previous operation.

Water of crystallization may be removed from the hydrated compound, for example by heating, eventually to produce the anhydrous product.

In carrying out the crystallization, we have found it advantageous to employ a vessel, the shape of which is similar to the crystallizing vessel described in British patent specification #333,598, i. e. a vessel having a curved bottom and provided with a vertical annular partition, with means to circulate the liquor through the central and annular spaces in contrary directions.

The mother liquor from the crystallization operation contains the excess alkali with small amounts of aluminate, 27–38 parts $Na_2O$ to 3–1 parts $Al_2O_3$ is the normal composition of such mother liquors and they can advantageously be used as make-up liquors for the opening up of subsequent charges of bauxite.

The following is a concrete example of a process of producing hydrated sodium aluminate crystals according to our invention.

Bauxite is extracted with a 40% NaOH solution at about 120–130° C. and at atmospheric pressure, in such quantity that the liquor obtained has a $Na_2O : Al_2O_3$ ratio of about 1.9 : 1. This liquor is diluted to 28% concentration (expressed in terms of $Na_2O+Al_2O_3$) and the diluted liquor is filtered, employing for this purpose a filter press carrying nickel gauze leaves and with a calcined diatomite precoat.

The filtrate is reconcentrated to about 55% and to the liquor, maintained in a crystallization vessel of the type described, is added a small proportion of solid seed crystals. The temperature of the liquor is then allowed to fall from about 80° C. to 30° C. when sodium aluminate hydrate of the formula $Na_2O.Al_2O_3.2H_2O$ crystallizes out in an amount corresponding to about 48% of the reaction mass, leaving 52% of mother liquor containing 28% $Na_2O$ and 3% $Al_2O_3$; the crystals are separated from the mother liquor as for instance by centrifuging through nickel gauze.

The so obtained sodium aluminate hydrate is stable and easily soluble in water.

The corresponding anhydrous sodium aluminate of the formula $Na_2O.Al_2O_3$ is obtained in a similar manner by adjusting a sodium aluminate solution to contain an excess of caustic ($Na_2O$ from 1.5 to 2.5 part: $Al_2O_3$ 1 part) concentrating said solution to about 78% and allowing this solution to crystallize and separating the crystals from the mother liquor all at a temperature above 100° C.

We claim:

1. Process for the production of sodium aluminate which comprises extracting bauxite or other aluminous ore so as to obtain a liquor having a $Na_2O : Al_2O_3$ ratio of 1.5–2.5 : 1, and crystallizing said liquor to yield either the hydrated compound $Na_2O.Al_2O_3.2H_2O$ or the anhydrous compound $Na_2O.Al_2O_3$, the hydrated compound being obtained when the concentration of the liquor, expressed as $Na_2O+Al_2O_3$, is within the range 45–65%, and the anhydrous compound when the concentration of the liquor is about 78% and the temperature of crystallization about 100° C. or over.

2. A process of making a crystalline sodium aluminate which comprises preparing an aqueous solution of sodium aluminate of a composition within the range of 1.5–2.5 $Na_2O$ to $1Al_2O_3$, adjusting said solution to a concentration of over 45% expressed in terms of $Na_2O+Al_2O_3$, cooling said solution and separating the crystals of sodium aluminate formed from their mother liquor.

3. In a process of making a crystalline sodium aluminate, the steps which comprise preparing an aqueous solution of sodium aluminate of a composition within the range of 1.5–2.5$Na_2O$ to $1Al_2O_3$, adjusting said solution to a concentration or over 45% expressed in terms of $Na_2O+Al_2O_3$, adjusting the cooling temperature in respect to the concentration so that within the range of concentrations between 45 and 65% the cooling temperature is below 100° C. and at concentrations of about 78% the cooling temperature is above about 100° C.

4. In a process of making a crystalline sodium aluminate hydrate, the steps which comprise preparing an aqueous solution of sodium aluminate of a composition within the range of 1.5–2.5$Na_2O$ to $1Al_2O_3$, adjusting said solution to a concentration of from 45 to 65% expressed in terms of $Na_2O+Al_2O_3$ and cooling said solution to a temperature of below 100° C.

5. In a process of making a crystalline sodium aluminate hydrate, the steps which comprise preparing an aqueous solution of sodium aluminate of a composition of about 1.9–2$Na_2O$ to $1Al_2O_3$, adjusting said solution to a concentration of about 55% expressed in terms of $Na_2O+Al_2O_3$ and cooling it to from 80 to 30° C.

6. In a process of making an anhydrous crystalline sodium aluminate, the steps which comprise preparing an aqueous solution of sodium aluminate of a composition within the range of 1.5–2.5$Na_2O$ to $1Al_2O_3$, adjusting said solution to a concentration of about 78% expressed in terms of $Na_2O+Al_2O_3$, cooling said solution to a temperature not below 100% C. and separating the crystals formed from their mother liquor.

7. In a process of making sodium aluminate, the steps of preparing an aqueous solution of sodium aluminate of a composition within the range 1.5 to 2.5$Na_2O$ to $1Al_2O_3$, adjusting said solution to a concentration of 45–65% expressed in terms of $Na_2O+Al_2O_3$, cooling said solution to crystallize out $Na_2O.Al_2O_3.2H_2O$ and adding to the resulting magma a suitable proportion of mother liquor from a previous operation to facilitate handling of the said magma.

LESLIE MARSHALL CLARK.
HENRY MILLS SPITTLE.